United States Patent
Steib et al.

(10) Patent No.: US 10,909,874 B2
(45) Date of Patent: Feb. 2, 2021

(54) SIMULATOR FOR CRANE, CONSTRUCTION MACHINE OR INDUSTRIAL TRUCK

(71) Applicant: Liebherr-Werk Biberach GmbH, Biberach an der Riß (DE)

(72) Inventors: Thomas Steib, Ummendorf (DE); Sven Brandt, Munich (DE); Michael Palberg, Riedlingen (DE); Jürgen Resch, Begernau (DE)

(73) Assignee: Liebherr-Werk Biberach GmbH, Biberach an der Riß (DE)

( * ) Notice: Subject to any disclaimer, the term of this patent is extended or adjusted under 35 U.S.C. 154(b) by 300 days.

(21) Appl. No.: 16/070,277

(22) PCT Filed: Jan. 11, 2017

(86) PCT No.: PCT/EP2017/000031
§ 371 (c)(1),
(2) Date: Jul. 14, 2018

(87) PCT Pub. No.: WO2017/121639
PCT Pub. Date: Jul. 20, 2017

(65) Prior Publication Data
US 2019/0019430 A1  Jan. 17, 2019

(30) Foreign Application Priority Data
Jan. 14, 2016  (DE) .................. 10 2016 000 351

(51) Int. Cl.
*G09B 9/05* (2006.01)
*G06F 3/01* (2006.01)
*G09B 19/16* (2006.01)

(52) U.S. Cl.
CPC .............. *G09B 9/05* (2013.01); *G06F 3/012* (2013.01); *G09B 19/167* (2013.01)

(58) Field of Classification Search
CPC .......... G09B 9/04; G09B 9/042; G09B 9/048; G09B 9/05
See application file for complete search history.

(56) References Cited

U.S. PATENT DOCUMENTS

| 8,195,368 B1 * | 6/2012 | Leban ................... B66C 13/063 |
| | | 701/50 |
| 10,162,797 B1 * | 12/2018 | Culver ..................... G09B 9/02 |

(Continued)

FOREIGN PATENT DOCUMENTS

| DE | 102006044086 A1 | 4/2008 |
| DE | 102013011818 A1 | 1/2015 |

OTHER PUBLICATIONS

"Ship-to-Shore Crane Simulator | STS Crane Simulator". published by vortexsim on YouTube on or before Aug. 26, 2013; printed and accessed from URL <https://www.youtube.com/watch?v=VnBXbPFUNRs>, 10 pages.*

(Continued)

*Primary Examiner* — Jason Skaarup
(74) *Attorney, Agent, or Firm* — Troutman Pepper Hamilton Sanders LLP; Ryan A. Schneider

(57) ABSTRACT

The invention relates to a simulator for a crane, a construction machine or an industrial truck, provided with a control station including at least one input means for inputting control commands, a graphical simulation module for calculating a virtual representation of the machine surroundings and/or machine components visible from the control station, such as a boom or a load hook, and a display device for displaying the calculated virtual representation, a movement simulation module being provided for determining movements and/or deformations of the machine components according to the inputted control commands, according to which the graphical simulation module calculates the virtual representation. According to the invention, the control sta- (Continued)

tion is movably mounted and can be moved by a drive device according to the movements and/or deformation of the machine components determined by the movement simulation module.

19 Claims, 3 Drawing Sheets

(56) References Cited

U.S. PATENT DOCUMENTS

| | | | | |
|---|---|---|---|---|
| 10,410,124 B1* | 9/2019 | Zhou | | G06N 5/04 |
| 2003/0224333 A1 | 12/2003 | Vastvedt | | |
| 2009/0162814 A1* | 6/2009 | Swan | | G09B 9/04 |
| | | | | 434/69 |
| 2009/0182537 A1* | 7/2009 | Kang | | G09B 9/05 |
| | | | | 703/2 |
| 2012/0154572 A1* | 6/2012 | Stratton | | G09B 9/048 |
| | | | | 348/114 |
| 2013/0004920 A1* | 1/2013 | Pabst | | G09B 9/05 |
| | | | | 434/69 |
| 2013/0245815 A1* | 9/2013 | Schneider | | B66D 1/525 |
| | | | | 700/228 |
| 2014/0297136 A1* | 10/2014 | Miyoshi | | B66C 13/18 |
| | | | | 701/50 |
| 2015/0310758 A1* | 10/2015 | Daddona | | G09B 9/02 |
| | | | | 434/62 |
| 2016/0035251 A1* | 2/2016 | Delplace | | G09B 19/003 |
| | | | | 434/66 |

OTHER PUBLICATIONS

Langen, I., et al. Simulation of Dynamic Behaviour of a FPSO Crane, Stavanger University College, 2003, 17 pages.*
International Search Report and Written Opinion for International Patent Application No. PCT/EP2017/000031 dated Mar. 23, 2017.
German Search Report for German Patent Application No. 10 2016 000 351.0 filed Jan. 14, 2016.

* cited by examiner

SIMULATOR FOR CRANE, CONSTRUCTION MACHINE OR INDUSTRIAL TRUCK

CROSS-REFERENCE TO RELATED APPLICATIONS

This is a § 371 national stage of International Application PCT/EP2017/000031, with an international filing date of 11 Jan. 2017, which claims the benefit of DE Patent Application Serial No. 10 2016 000 351.0, filed on 14 Jan. 2016, the benefit of the earlier filing date of which is hereby claimed under 35 USC § 119(a)-(d) and (f). The entire contents and substance of all applications are hereby incorporated by reference.

BACKGROUND OF THE INVENTION

1. Field of the Invention

The present invention refers to a simulator for a crane, a construction machine or an industrial truck, provided with a control station comprising at least one input means for inputting control commands, a graphical simulation module for calculating a virtual representation of the machine surroundings and/or machine components visible from the control station, such as a boom or a load hook, and a display device for displaying the calculated virtual representation, wherein a movement simulation module is provided for determining movements and/or deformations of the machine components according to the inputted control commands, according to which the graphical simulation module calculates the virtual representation.

2. Description of Related Art

Cranes and similar large-size machines such as boring-ramming machines, surface miners or rope-operated excavators are very complex to operate and control and thus difficult to learn, so that the usual training and teaching materials such as photos, diagrams or even videos are not sufficient to effectively reproduce the operation and monitoring and thus to render them easy to learn. In particular a problem is not only represented by the multitude of control functions and their interactions and the connected input means, which are rather complex in their entirety, such as joysticks, foot pedals and control switches, but also by the often unusual machine-specific reactions of the machine structure to movements of the actuators. Cranes, such as rotating tower cranes or telescopic rocking cranes, but also port or maritime cranes have long, slender structural components such as boom or tower structures, which are subject to torsion and are relatively soft, so that acceleration or deceleration processes of the actuators cause structural deformations and oscillatory movements, which cause difficulties during operations even by experienced crane operators, if they switch to a new crane type. In contrast to small devices with structures, which are approximately rigid, in the case of rotating tower cranes, for example, deformations of the tower structure and of the boom systems may occur, if a load is taken, or the load may oscillate about the vertical axis during rotation and the boom may consequently subsequently perform rotating oscillations. Something similar may occur in the case of rope-operated excavators or boring-ramming machines, so that the crane operator or machine operator gets uneasy when putting the theoretically acquired control processes into practice and experiencing corresponding crane reactions.

In order to provide a teaching and training which is closer to reality, the use of crane simulators has already been proposed, in which the crane operator to be trained, in an approximately realistic control station, which may correspond, for example, to the crane operator cabin of a respective crane type, by using the provided input means such as joysticks, pedals, control switches or touchscreens, may input control commands, in order to experience the most realistic crane reactions to these control commands. To this end, on a display device, which may comprise a plurality of display screens, as known, which are positioned in the field of view of the control station, a virtual representation of the crane surroundings as well as of the crane components, which are visible from the control station, such as booms and load hooks, may be displayed, wherein the virtual representation of the crane surroundings and of the crane components is calculated by a graphical simulation module, according to the inputted control commands.

If, for example, the crane is rotated around the vertical axis or a corresponding control command is input, then the graphical simulation module calculates the representation of the crane surroundings, such that this representation travels on the screen from right to left and vice versa, so that the virtual crane surroundings displayed on the display device similarly travel past the operator, as this would occur in the case of a "real" rotation of a crane in its crane cabin. If, on the other hand, a control command is input, which causes, for example, a lowering of the load hook and/or an oscillation of the boom, then the graphical simulation module modifies the virtual representation such that the crane hook moves downwards or the boom oscillates on the display device. Through such a realistic simulation of the crane operation, the operator may more easily perceive the reactions to an actuation of the input means of the control station.

Such a crane simulator is known for example from DE 10 2013 011 818 A1. There, a crane operator cabin as a control station is provided with corresponding input means, wherein the viewing window or glass pane of the reproduced crane operator cabin are replaced by display screens, on which the virtual representation of the crane surroundings is displayed. Through a technical simulation module, a dynamic behavior of the control and driving components has to be simulated and taken into account in the displayed representation, wherein in this case, the control movements of crane components such as of the lifting device, which occur in case of determined crane movements have to be prevalently represented.

In this previously known crane simulator the realistic level of the virtual representation is however still limited. On one hand, due to the complex calculations, which are required for determining the dynamic behavior, a delayed reaction or a delayed representation of the virtual crane reality with respect to the actual real-time crane reactions may occur, in particular when a plurality of adjusting movements have to be simultaneously virtually transformed. On the other hand, the intuitive perception of the crane reactions to specific control commands is limited by the possible representations of the virtual crane surroundings which may be displayed on the screens.

Based on this context, the object of the present invention is to provide an improved simulator of above the type, which avoids the drawbacks of the state of the art and which develops the same in an advantageous way. In particular, a more realistic simulation of the crane or machine simulation should be obtained, which improves the training effectiveness, and which reproduces and facilitates the learning of the effective crane or machine behavior.

SUMMARY OF THE INVENTION

1. According to the invention, this object is achieved by a simulator for a crane, a construction machine or an industrial truck, provided with a control station comprising at least one input means for inputting control commands, a graphical simulation module for calculating a virtual representation of the machine surroundings and/or machine components visible from the control station, and a display device for displaying the calculated virtual representation, wherein a movement simulation module is provided for determining movements and/or deformations of the machine components, such as a boom or a load hook, according to the inputted control commands, and the graphical simulation module is adapted for calculating the virtual representation according to the determined movements and/or deformations, characterized in that the control station is movably mounted and a drive device is provided for moving the control station according to the movements and/or deformations determined by the movement simulation module.

It is thus proposed to represent crane or machine reactions to control commands input at the control station, for example in the form of crane movements and/or deformations not only in the form of a virtual representation on the display device but also by transforming them into actual movements of the control station caused by the crane or machine reactions, in order to provide the simulator user with a more realistic effect and experience of the dynamic machine reactions. The control station, which may comprise an operator seat, for example, is thus not statically mounted in a space, such as on the floor, but may be moved by a drive device within that space. According to the invention, the control station is movably mounted and may be moved by a drive device according to specific movements and/or deformations of the machine components which are determined by the movement simulation module. If the movement simulation module determines deviations of machine components such as the crane tower, due to adjustment movements or deformations which influence the position of the actual crane operator cabin, then the drive device is correspondingly controlled by a drive control device, in order to reproduce the movement of the crane operator cabin and to correspondingly move the control station. If at the control station, for example, a command for rotating the crane about a vertical axis is input, then the control station is correspondingly rotated by the drive device about the vertical axis. If for example the control command for lifting a heavy load is input, which in reality may cause a slight pitching movement of the crane structure together with a slight torsion of the tower, then the control station is slightly moved forward and/or slightly tilted forward by the drive device.

In order to allow the most realistic reproduction of the movements of the control station, which occur during real operation, the drive device may be moved along multiple axes, and/or may perform both rotational and translational movements. In particular, the control station may be movably mounted on a plurality of axes, and the drive device may comprise at least one vertical rotational axis and at least one oscillatory axis and/or two horizontal translational axes. In order to reproduce even complex control station movements, the drive device may have three rotational or tilting axes or may be configured with three rotationally operating axes, and three translationally operating axes, so that the control station may be rotated or tilted about all three space axes and may be translationally displaced along all three space directions. Depending on the crane or machine type to be simulated also simpler embodiments of the drive device with less movement axes may be considered.

According to a further aspect, the movement simulation module is configured in such a way that the crane or machine structure is not a rigid, infinitely stiff structure, but has to be considered as an elastically deformable and/or resilient and/or relatively soft structure, which—in addition to the adjusting movement axes of the machine, such as the boom oscillation axis or the tower rotation axis—also allows movements and/or position modifications due to deformations of the structural components. The fact that the movements of the machine structure due to structural deformations under load or dynamic loads are taken into account is particularly important in the case of oblong, slender structures, which are intentionally stretched to the static and dynamic limits—in consideration of the required safety reserves—such as in cranes, since in this case movement components such as of the crane operator cabin, but also of the load hook position are added to the deformations of the structural components. In order to provide, in this case, an actually realistic teaching or a realistic training, the movement simulation module considers such deformations of the machine structure under static and dynamic loads.

In particular, the determination device for determining such structural deformations may have a computing unit, which calculates these structural deformations based on a stored computing model according to the control commands which are input at the control station. Such a model may be similar to a finite-element model or may be a finite-element model, wherein advantageously however a considerably simpler model is used with respect to a finite-element model, which, for example, may be determined empirically by detecting the structural deformations under specific control commands and/or load conditions on a real crane or a real machine. Such a calculation model may for example operate with tables, in which specific control commands are associated to specific deformations, wherein intermediate values of the control commands may be converted into corresponding deformations by means of an interpolation device.

The use of such a simplified calculation model with respect to a finite-element model allows a temporally faster determination of the structural deformations and thus a more realistic simulation of machine movements in real time or in almost real time with a lower computing power.

The deformations of the structural components considered by the movement simulation module may on one hand be considered for controlling the drive device for moving the control station, so that the control station reproduces the movements of the control station which occur due to the deformations of the structural components. Alternatively or additionally, the determined structural deformations may also consider in the calculation of the virtual representation of the machine surroundings and/or of the machine components viewable within the same, such as in the virtual representation the flexion of the boom is represented, or the horizon of the crane surroundings is moved upwards, in order to reproduce a slight pitching forward of the crane operator cabin due, for example, to a tower deformation.

In order to further increase the realistic perception of the user of the simulator, according to a further aspect, the virtual representation provided by the graphical simulation module originating from the simulated world are superimposed with live images coming from the control station, which may for example show movements of the simulator user. In particular, on the display device, the virtual representations of the machine surroundings and/or of the therein visible machine components generated by the graphical simulation module and the live images recorded at the control station by a live camera may be simultaneously displayed in a superimposed way. Such a superposition of images from the simulated world and of live images provides the simulator user with a particularly strong realistic feeling.

To this end, the display device may advantageously be formed by a head-mounted, in particular glasses-like display device, such as virtual reality glasses and with a camera which may also be head-mounted, such as a helmet-camera or which may be integrated in the virtual reality glasses, which provides the live images, which are displayed, together with the artificially generated virtual representation on the display device, in particular the virtual reality glasses.

The camera for providing live images may advantageously be a stereoscopic camera, which provides stereoscopic images, preferably in a camera view direction at least approximately corresponding to the direction of view of the pair of eyes of the user, which images may be included at a corresponding position of the display device, in particular of the virtual reality glasses. Thereby a particularly realistic feeling may be provided to the user.

Fundamentally it may also be conceived, that images from the simulation world and the live images are superimposed on a conventional screen, wherein in this case, a user may wear a live camera on its head, which provides images with at least approximate the direction of view of the user, so that on the display device, which is formed for example by a plurality of display screens, also a live representation of the user arm or a live capture part of the control station may be superimposed. A more realistic and thus more impressive simulation may however be achieved by superimposing the same on the display surfaces of virtual reality glasses.

The superimposing device for superimposing the live images from the camera with the virtual representation from the graphical simulation module may advantageously operate according to the so called green-screen technology, wherein the superimposing device recognizes in the live image colored surfaces with a predetermined color and replaces these image regions with the virtual representation from the simulation module. To this end, the control station may comprise an operator cabin wall, in which window regions—such as corresponding to the observation windows of a real crane operator cabin are colored with a key color, which is possibly very different from the other colors of the other components within the camera view field, such as the color of the window frames, the input means and the operator cloths, and the color of the skin, so that the live image taken in the control station shows those colored surfaces with a specific color reproduction, while all other image surfaces are shown with other colors. The live image surfaces or surface regions colored with the key color—such as green—are thus replaced by the virtual representation of the machine surroundings and/or of the machine components visible within the same, so that the superimposed image or the superimposed representation shows, on one hand, the control station of the simulator, its components and the body parts of the operator within the view field of the live camera, in real time, as a live image, and on the other hand, in the window regions captured by the live camera of the operator cabin wall, the virtual representation of the machine surroundings and of the visible machine components.

The virtual representation of the machine surroundings may be advantageously modified by the graphical simulation module and adapted, according to different data sets, which may be included through an interface into the simulation module, to different scenarios. In particular, planning data such as CAD data of a construction and/or construction site real data, which reproduce, according to the construction progress, the effective state of a building or construction, may be included through a corresponding data interface into the simulation module and may be used by the simulation module for generating the virtual representation of the machine surroundings according to the data set, in particular according to the superimposed planning data and/or construction site effective data, or to adapt the same accordingly.

The coupling of the graphical simulation module with construction site or construction specific data allows the simulator to be used precisely for training on the works to be done for a specific construction work or for a specific site. If for example a complicated crane lifting movement has to be performed, which has to juggle a load past various obstacles and for example to deposit the same within a construction area, which is not visible, this also can be trained repeatedly on the simulator.

The site or construction information may be CAD data or other geometric data of the construction or site, wherein also digital image data may be used, which reproduce the actual building and its progress. Such image data may be transmitted, as machine surroundings data over the CAD-interface or a suitable image data interface to the graphical simulation module, which thus adapts the virtual representation to these acquired CAD and/or image data.

The modeling of a planned or already existing or partially executed construction site and the corresponding generation of the virtual representation of the machine surroundings by the graphical simulation module is a particularly useful means for ensure the logistics on site and also for simulating and training on critical processes before construction start.

In an embodiment of the invention the simulator may also be used as a remote control device for remotely controlling a "real" crane, a construction machine or an industrial truck, wherein between the crane, the machine and/or the truck and the simulator a communication connection may be provided, through which the control commands input at the control station of the simulator may be transmitted to the control device of the crane, machine and/or truck. The "real" crane or the respectively remotely controlled "real" device performs the control commands inputted at the control station of the simulator, and at the same time the virtual representation, generated by the simulator, of the crane surroundings and of the visible crane components shows how the crane implements the control commands. The movement parameters and sensor signals detected on the real crane may be transmitted back to the simulator and may be used for generating the virtual representation of the crane surroundings, in order to ensure that a representation actually corresponding to the actual crane surroundings and position is displayed on the display device of the simulator.

Regardless of the cited options for use as a remote control station, the simulator may provide for the calculation of the parameters required for the movement simulation not only on a simulation computer, by at least partially determine the same in the course of the data emulation by using actually moving hardware components, which may be part of the simulator. Such a data emulation module of the simulator may in particular comprise actuator components and/or power electronics components, by means of which actual actuation movements may be performed, which reproduce the real crane or machine movements, and which provide data, which characterize these movements, such as in the form of sensor signals, which reproduce the actuating movements of the actuating components. Through such a data emulation, movement and/or position parameters, which may be then used for the movement simulation, may be provided considerably faster and with a lower computing power, which allows a more realistic real time or almost real time simulation.

In order to obtain a particularly fast and realistic determination of movements of the machine components according to control commands at the control station, according to a further aspect the movement simulation module may be a hybrid device or hybrid module, which comprises a computer for simulating movement and/or position parameters and hardware components which are at least similar to the real crane and machine actuators, such as drive units, rotation transducers or frequency converters, through which the adjusting movements may be reproduced and movement and/or position parameters may be determined. In particular "real" hardware components are used, which are also mounted as adjusting drives and/or control device components in the crane or machine to be simulated.

In particular, the movement simulation module may comprise the electric cabinet or at least part of the electric cabinet and its components, which are also used in the machine to be simulated and form part of the machine control. In particular, the power electronics and/or at least a part of the power electronics such as a frequency converter may be used for reproducing the adjusting movements, which are triggered by the control commands input at the control station.

Moreover, in a development of the invention, actuator units, such as servo motors may be used, which are used for the emulation of the movements of the actuators of the machine or machine components to be simulated. For a respective actuator axis a drive unit is used, such as a servo drive unit, which—in particular through the frequency converter—is controlled by a control command, and which may also be coupled with a further actuation unit, such as a servo drive unit, by which a counter-torque and/or a counter-load may be exerted, in order to simulated actual loads, resistances or inertias. With the second drive unit a load may be simulated, for example, which opposes a lifting device, or a torque may be simulated, which opposes the rotating drive.

The adjusting movement performed by considering the applied counter torque or counter load of the drive unit may be detected by a suitable detection device, wherein a corresponding detection signal reproduces the actual adjustment movement and may be used as a sensor signal in the further simulation, in particular for determining movements and/or positions and/or deformations of the structural parts and/or for simulating the virtual representation of the machine surroundings and/or of the machine components which are visible within the same.

Advantageously, many of these drive units or drive units pairs comprising a drive and a counter load drive and a corresponding detection device are used for determining the various adjustment axes and the corresponding movements of the machine drive to be simulated.

The sensor values of the drive units of the adjustment axes, which are actuated depending on the control station control commands and thus moved, according to a further aspect, are not simulated or calculated by a computing model, but are emulated or adjusted based on hardware components, which are similar to the real components of the machine to be simulated, and which are output as actual sensor values.

With such a data emulation system the movement simulation module may determine movements and/or positions of the machine components, with a much higher speed and lower computing power, so that the virtual representation of the machine surroundings and/or of the machine components and also of the connected movements of the machine stand are much faster and more realistic. Moreover, the generated sensor signals may be displayed at the control panel and/or used for further monitoring measures such as load monitoring or working area limits, which are displayed or maybe simulated on the control panel.

If the crane simulator is used for the simulation of a rotating tower crane and of its operation, the drive unit pairs for performing the corresponding adjusting movements and provision of the corresponding counter torque or counter load may correspond in particular to the rotating tower drive—or in case of an upper rotating unit, to the boom rotating drive—the lifting device and the trolley driving gear.

BRIEF DESCRIPTION OF THE DRAWINGS

The invention is explained in the following by means of a preferred examples and corresponding drawings. In particular, in the drawings.

DETAIL DESCRIPTION OF THE INVENTION

Figure 1:
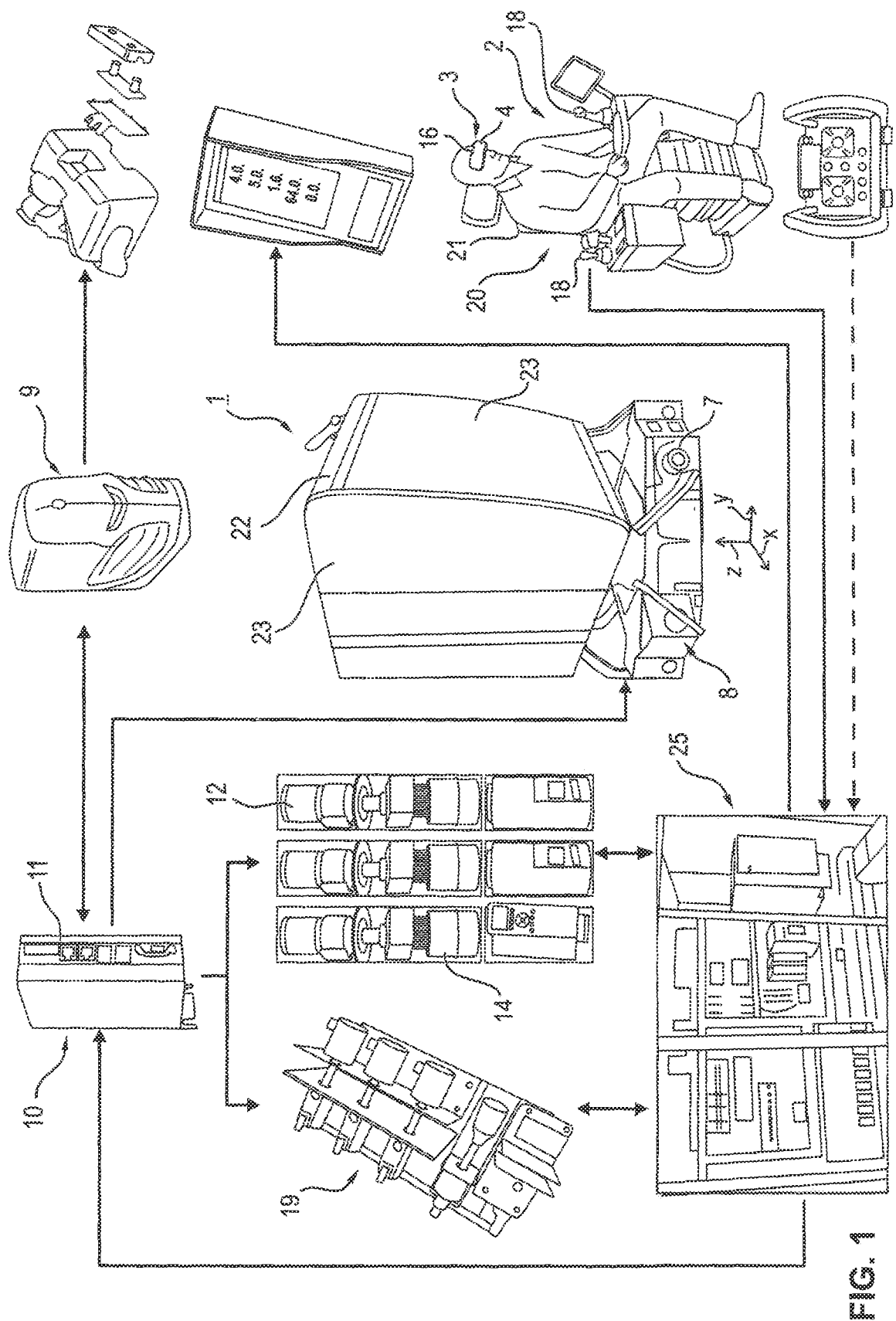
FIG. 1 shows a schematic representation of the components of a crane simulator according to an advantageous embodiment of the invention.

To facilitate an understanding of the principles and features of the various embodiments of the invention, various illustrative embodiments are explained below. Although exemplary embodiments of the invention are explained in detail, it is to be understood that other embodiments are contemplated. Accordingly, it is not intended that the invention is limited in its scope to the details of construction and arrangement of components set forth in the following description or illustrated in the drawings. The invention is capable of other embodiments and of being practiced or carried out in various ways.

As used in the specification and the appended Claims, the singular forms "a," "an" and "the" include plural references unless the context clearly dictates otherwise. For example, reference to a component is intended also to include a composition of a plurality of components. References to a composition containing "a" constituent is intended to include other constituents in addition to the one named.

In describing exemplary embodiments, terminology will be resorted to for the sake of clarity. It is intended that each term contemplates its broadest meaning as understood by those skilled in the art and includes all technical equivalents that operate in a similar manner to accomplish a similar purpose.

Ranges may be expressed as from "about" or "approximately" or "substantially" one value and/or to "about" or "approximately" or "substantially" another value. When such a range is expressed, other exemplary embodiments include from the one value and/or to the other value.

Similarly, as used herein, "substantially free" of something, or "substantially pure", and like characterizations, can include both being "at least substantially free" of something, or "at least substantially pure", and being "completely free" of something, or "completely pure".

"Comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

The characteristics described as defining the various elements of the invention are intended to be illustrative and not restrictive. For example, if the characteristic is a material, the material includes many suitable materials that would perform the same or a similar function as the material(s) described herein are intended to be embraced within the scope of the invention. Such other materials not described herein can include, but are not limited to, for example, materials that are developed after the time of the development of the invention.

As shown in FIG. 1, the simulator 1 may be a crane simulator, which comprises a control station 2 such as a crane operator cabin, which is essentially a "real" crane operator cabin, such as those used in a crane, such as a rotating tower crane, a port crane or a maritime crane or a movable telescopic crane.

The control station 2 may comprise, as is known, an operator seat position 21, such as an operator seat 20, around which various input means 18 for inputting control commands are positioned. The input means 18 may for example comprise a joystick, a touchscreen, a control lever, input keys and switches, knobs, cursors and similar.

The operator station is surrounded in this case by an operator station wall 22, which may correspond to a cabin enclosure and may comprise window regions 23, which in real crane operator cabins are made of glass panes, while in the present case they are colored with a specific color, such as by coating with a green foil, in order to superimpose a virtual machine surroundings by means of the green-screen-technology, as described in the following.

The control station 2 is mounted on a movement platform 7, by means of which the control station 2 may be moved along multiple axes. The movement platform 7 is advantageously provided with multiple axial mobility, in particular it may be tilted or rotated about all three spatial axes x, y, and z may be translated along these axes.

The movement axes x, y and z of the movement platform 7 are associated to actuators of a drive device 8, such as electric motors and/or hydraulic cylinders and/or hydraulic motors, in order to move the control station 2 about or along cited axes.

The drive device 8 is controlled by a movement control device 24, such as an industrial PC.

The movement control device 24 may be in particular a part of a movement simulation module 10, which may determine the crane movements and/or positions and/or orientations of crane components such as of the boom or of the tower and also torsions of structural components such as the boom or the tower according to the control commands input at the control station 2. The movement simulation module 10 thus determines, in other words, the effects of the input control commands on the crane to be simulated, i.e. which movements, positions, directions and torsions of the crane components would be caused by the control commands on the simulated crane and outputs corresponding movement signals characterizing these variables.

The movement simulation module 10 determines the movement values not or not only by calculating by means of a calculation model but uses actual hardware components in the form of driving and control components, which perform actual movements and are reproduced according to corresponding hardware components on a real crane.

Figure 2:
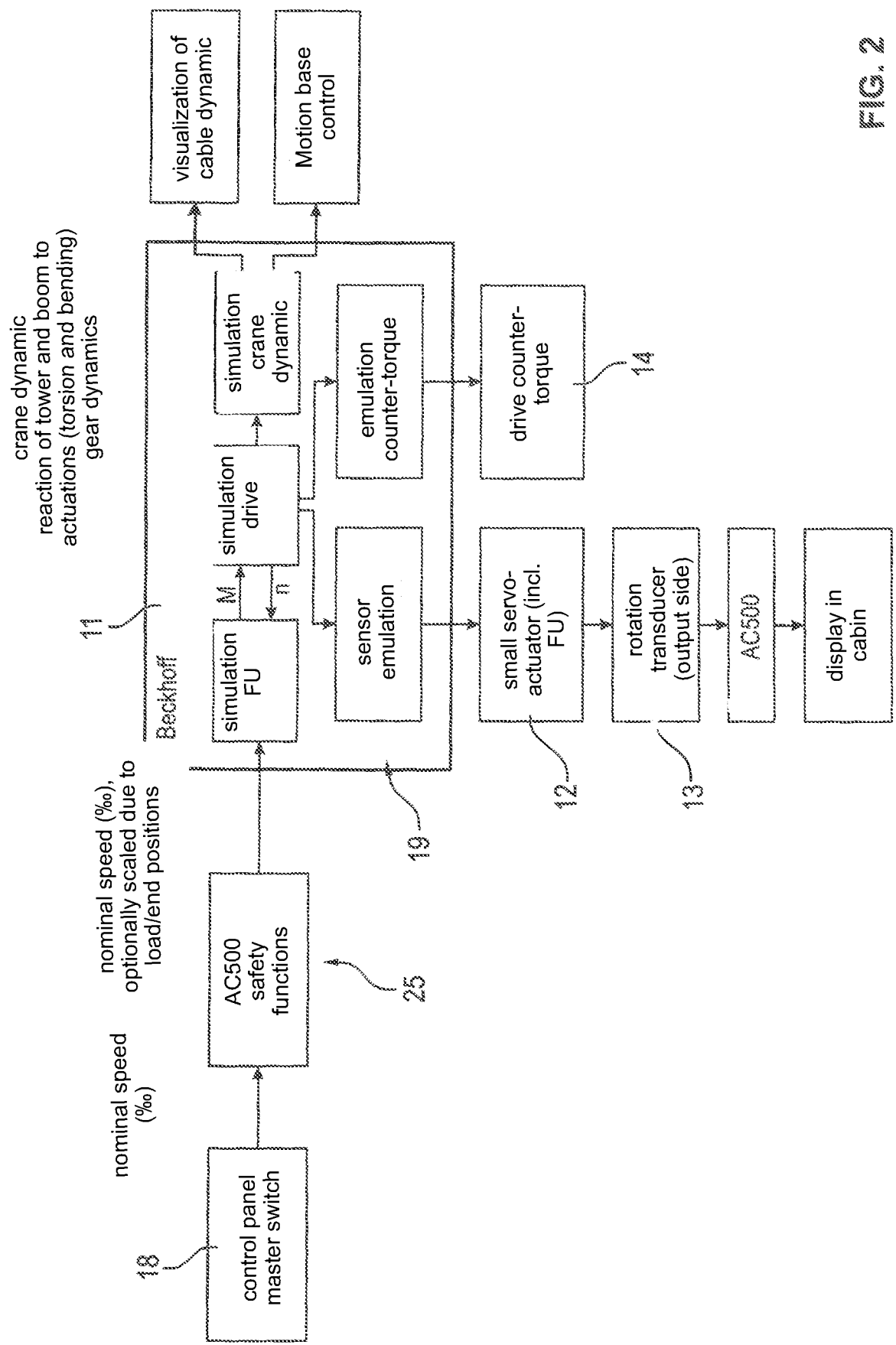
FIG. 2 shows a schematic representation of the hardware components for the data emulation of the movement simulation module.
Figure 3:
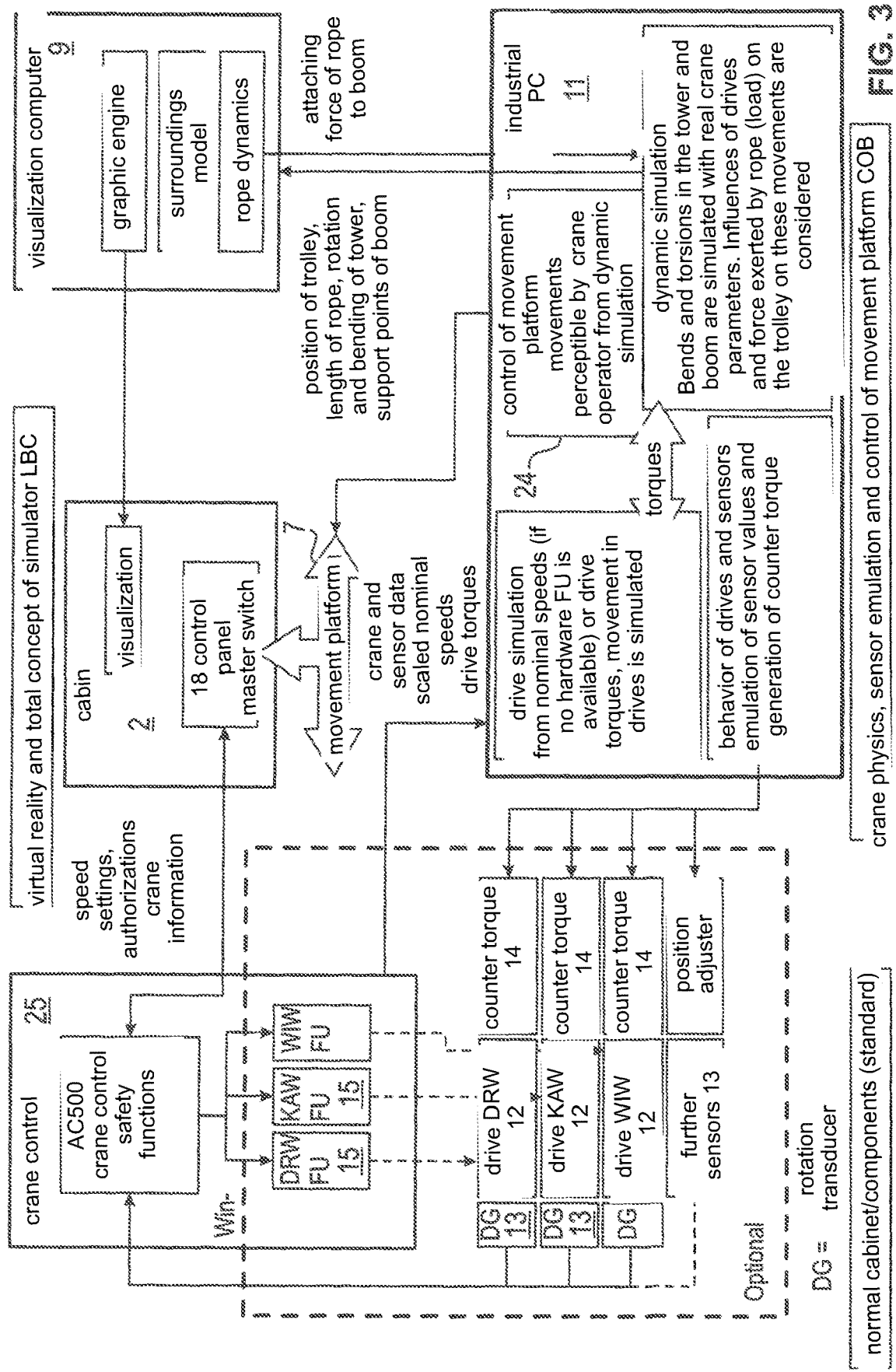
FIG. 3 shows a schematic block-diagram-like representation of the entire concept of the simulator based on the preceding figures and the functional interactions of its components.

As detailed in FIGS. 2 and 3, the movement simulation module 10 comprises at least the essential components of a crane control 25, such as those present in the electric cabinet of the crane. In particular, the crane control 25 comprises the frequency converters 15 of different crane drives, such as the rotating drive, the trolley drive gear and the lifting device. The crane control 25 may for example comprise further control and/or power electronics components, in particular load monitoring components, work area limiting components, etc.

The crane control 25 is communicatively connected to the control station 2 and its input means 18, so that the crane control 25 can process the input control commands further, wherein in particular the frequency converter 15 may control drive units 12, depending on the input control commands, for example in the form of servo drives. The control commands entered at the control station 2 are thus implemented into real movements or drive torques and forces of the drive units 12.

The drive units 12 can be coupled with counter drive units 14, through which motion resistances can be applied to the drive units 12 in order to be able to reproduce real resistances such as lifting loads, wind forces, inertias or dynamic loads. The counter drive units 14 can be controlled by the aforementioned industrial PC, which also implements the motion control device 24. The control of the counter drive units 14 can be carried out using various presets or programs, for example, by predeterminable lift loads, predeterminable wind programs or based on predetermined functions or tables such as dynamic reactions when braking the trolley or the rotary movement. For this purpose, in a memory module of the control device for driving the controlling drive units 14 corresponding models, tables or functions may be stored.

As shown in FIGS. 2 and 3, the drive units 12 are associated with detection devices 13, such as encoders or other position and/or motion sensors, by means of which movement or position signals are provided which characterize the actuating movements of the drive units 12. The motion simulation module 10 thus provides real sensor signals as motion parameters that can be displayed at the control station 2 and can also be used for further simulation functions. In particular, according to the motion signals provided by the rotary encoders, structural distortions such as tower bends, boom bends and similar deformations can be determined using a computer model and the drive device 8 of the movement platform 7 can be controlled to move the control station 2 and the virtual representation of the crane environment can be generated, respectively as a function of the real sensor signals.

As shown in FIG. 3, the motion simulation module 10 may comprise a computer unit 11, which may also be implemented by the aforementioned industrial PC, by means of which computer unit 11 depending on the control commands inputted at the control station 2 and/or the emulated data generated by the data emulation device 19 or sensor signals generated by the detection device 13 associated to the drive units 12, structural distortions are determined, in particular bends and torsions in the crane tower and in the crane boom, wherein the computer unit 11 uses a calculation model considering the structural stiffness, as explained above.

On the basis of the emulated movement data and the deformation data determined therefrom, the movement control device 24 controls the drive device 8 of the movement platform 7 in order to move the control station 2 and to reproduce real crane operator movements that would occur if appropriate control commands were input in a real crane.

On the other hand, the aforementioned movement data and possibly also the deformation data are used to take into account crane reactions in a virtual representation, which is generated by a graphic simulation module 9 and displayed on a display device 3. The aforementioned virtual representation shows in particular the crane surroundings and visible crane components such as the crane boom and the load hook and can essentially correspond to the image that a crane operator would see from the crane operator's cabin. The virtual representation may correspond here to a photo- or video-like digital image, for example a pixel representation in several colors. Alternatively, however, a simplified graphical representation can also be provided, although the most realistic, photo- or video-like representation image is preferred.

Advantageously, the aforementioned virtual representation of the crane surroundings and the visible crane components are superimposed by a live image showing real components from the control station 2, in particular components visible from the head of the simulator user in the viewing direction such as the input means 18, the hands and the forearm of user and other components in the field of vision.

For this purpose, a camera 16 is advantageously provided, which may be designed as a portable head camera on the head of the user and may have appropriate fastening and/or mounting means for attachment to the head, for example in the form of a helmet camera. If the display device 3 is advantageously designed in the form of virtual reality glasses 4, which the user wears, the camera 16 can be integrated in these VR glasses.

Advantageously, the camera 16 is formed by a stereoscopic camera in order to be able to provide stereoscopic images corresponding to the viewing axes of the two eyes of the user.

The overlay device 17 for superimposing the virtual representation of the crane surroundings generated by the graphic simulation module 9 and the live image of the camera 16 can in this case in particular comprise a color-based image processing module 26 which may operate according to the so-called green screen technology. In particular, in the live image of the camera 16, the color-based image processing module 26 can recognize image regions which have a specific color deviating from the remaining image sub-areas and then replace these image regions with the virtual representation from the simulation module 9.

For this purpose, advantageously, the control station 2 may include an operator cabin wall 22, wherein window areas 23—for example, according to the viewing windows of a real crane cabin—are colored with a key color, which clearly differs from the remaining colors of the other components lying in the camera field of view, such as the color of the window frames, the input means 18 and the operator's clothing and skin color, so that the live image recorded in the control station 2 shows the colored areas in a particular color reproduction, while all other image surfaces are shown in different colors. The live image surfaces or partial surfaces colored with the key color—for example, green—are then replaced by the virtual representation of the machine environment and/or by the machine components visible therein, which is generated by the graphical simulation module 9, so that the superimposed image or the superimposed representation shows, on one hand, the control station 2 of the simulator, whose components and body parts of the user located in the field of view of the live camera in real time as a live image, and on the other hand, in the window areas 23 of the cabin wall 22, the virtual representation of the machine environment and the machine components visible therein.

The aforementioned virtual representation of the machine surroundings may be modified by the graphical simulation module 9 and may be adapted, according to different data sets, which may be superimposed through an interface into the simulation module, to different scenarios. In particular, planning data such as CAD data of a building and/or actual data of a construction site and/or image data which reproduce, depending on the construction progress, the actual state of a building or construction site, are included, through a corresponding data interface, such as a CAD-interface and/or an image data interface, into the simulation module 9, and are used by the simulation module 9 for the virtual representation of the machine surroundings according to the superimposed data set, in particular, according to the superimposed planning data and/or construction site actual data, for generating the virtual representation of the machine surroundings or for adapting it to the same.

The invention claimed is:

1. A simulator for a machine comprising:
   a control station comprising:
      a guide cabin wall, in which viewing windows are formed;
      an input means for inputting control commands;
      a graphical simulation module for calculating a virtual representation of a machine surroundings and/or machine components visible from the control station; and
      a display device for displaying the calculated virtual representation;
      wherein the viewing windows are colored;
   a camera for detecting a live image;
   a movement simulation module for determining movements and/or deformations of machine components according to inputted control commands; and
   a drive device;
   wherein the control station is movably mounted to the drive device for moving the control station according to the movements and/or deformations determined by the movement simulation module; and
   wherein the graphical simulation module has a color-sensible unit for superimposing the virtual representation into an image surfaces of the live image provided by the camera, which are colored in the same color as the viewing windows.

2. The simulator of claim 1, wherein the control station is movably mounted on a plurality of axes;
   wherein the drive device has a plurality of movement axes (x, y, z) which may be actuated depending on control commands entered at the control station; and
   wherein the graphical simulation module is configured to calculate the virtual representation depending on the determined movements and/or deformations.

3. The simulator of claim 2 further comprising a movement platform;
   wherein the control station is mounted on the movement platform, in which the drive device is integrated.

4. The simulator of claim 2 further comprising a superimposing device associated to the drive device;

wherein the superimposing device is adapted for superimposing the virtual representation generated by the graphical simulation module with the live image provided by the camera on the display device.

5. The simulator of claim 1, wherein the camera has a head mount for carrying the camera on the head of a simulator user and/or is formed by a head and/or helmet-camera.

6. The simulator of claim 1, wherein the camera is a stereoscopic camera for providing stereoscopic images at least approximately in a viewing direction of a simulator user.

7. The simulator of claim 1, wherein the display device has a head mount for carrying the camera on the head of a simulator user and/or is formed by display glasses.

8. A simulator for a machine comprising:
a control station comprising:
  a guide cabin wall, in which viewing windows are formed;
  an input means for inputting control commands;
  a graphical simulation module for calculating a virtual representation of a machine surroundings and/or machine components visible from the control station; and
  a display device for displaying the calculated virtual representation;
  wherein the viewing windows are colored;
a camera for detecting a live image;
a movement simulation module for determining movements and/or deformations of machine components according to inputted control commands;
a drive device; and
a superimposing device associated to the drive device;
wherein the control station is movably mounted to the drive device for moving the control station according to the movements and/or deformations determined by the movement simulation module;
wherein the superimposing device is adapted for superimposing the virtual representation generated by the graphical simulation module with the live image provided by the camera on the display device; and
wherein the graphical simulation module and/or the superimposing device has a color-sensible unit for superimposing the virtual representation into an image surfaces of the live image provided by the camera, which are colored in the same color as the inspection windows.

9. The simulator of claim 1, wherein the graphical simulation module comprises:
a data interface for the inclusion of construction and/or site data; and
an image processing device for generating and/or adapting the virtual representation of the machine surroundings according to the included construction and/or site data.

10. The simulator of claim 9, wherein the data interface is one or both of:
a CAD-interface and the image processing device is adapted for generating and/or adapting the virtual representation of the machine surroundings according to the CAD data included via the CAD-interface; and
an image data interface and the image processing device is adapted for generating and/or adapting the virtual representation of the machine surroundings according to the image data included via the image data interface.

11. The simulator of claim 1, wherein the movement simulation module further comprises a determination device for determining deformations of structural components of the machine to be simulated according to control commands inputted at the control station; and
wherein the determination device comprises a computing unit for calculating the deformations based on a stored deformation model of the structural components.

12. The simulator of claim 11, wherein the graphical simulation module is adapted for generating the virtual representation according to the calculated deformations of the structural components; and/or
wherein a control device is provided for controlling the drive device according to the calculated deformations of the structural components.

13. The simulator of claim 1, wherein the movement simulation module comprises a data emulation device for emulating movement data of the machine to be simulated; and
wherein the data emulation device comprises:
  an actuator component for performing an actuator movement according to a control command input at the control station; and
  an actuator detection device for detecting the actuator movement and for providing a corresponding movement signal.

14. The simulator of claim 13, wherein the data emulation device further comprises:
a first drive unit for performing actuator movements according to control commands input at the control station;
and a first drive unit detection device for detecting movements of the first drive unit and providing a movement and/or position signal.

15. The simulator of claim 14, wherein the movement simulation module further comprises a second drive unit for providing a counter-torque and/or a counter-load; and
wherein the second drive unit is configured to be coupled to the first drive unit.

16. The simulator of claim 14, wherein the movement simulation module further comprises a power control component for controlling the first drive unit.

17. The simulator of claim 16, wherein the movement simulation module further comprises an electric cabinet and/or a control unit, which corresponds to an electric cabinet and/or a control unit of the machine to be simulated or is reproduced according to same.

18. A method comprising:
providing a machine;
providing the simulator of claim 1; and
remotely controlling an operation of the machine with the simulator.

19. A system comprising:
the simulator of claim 1;
a machine; and
a communication connection provided between the machine and the simulator;
wherein control commands input at the control station of the simulator are configured be transmitted to the control device of the machine.

* * * * *